United States Patent
Shimura et al.

(10) Patent No.: US 9,735,949 B2
(45) Date of Patent: Aug. 15, 2017

(54) RECEIVING DEVICE AND RECEIVING METHOD

(71) Applicant: JAPAN AGENCY FOR MARINE-EARTH SCIENCE AND TECHNOLOGY, Yokosuka-ski, Kanagawa (JP)

(72) Inventors: Takuya Shimura, Kanagawa (JP); Hiroshi Ochi, Kanagawa (JP); Yoshitaka Watanabe, Kanagawa (JP)

(73) Assignee: JAPAN AGENCY FOR MARINE-EARTH SCIENCE AND TECHNOLOGY, Yokosuka-shi, Kanagawa (JP)

( * ) Notice: Subject to any disclaimer, the term of this patent is extended or adjusted under 35 U.S.C. 154(b) by 0 days.

(21) Appl. No.: 15/312,758

(22) PCT Filed: May 19, 2015

(86) PCT No.: PCT/JP2015/064314
§ 371 (c)(1),
(2) Date: Nov. 21, 2016

(87) PCT Pub. No.: WO2015/178372
PCT Pub. Date: Nov. 26, 2015

(65) Prior Publication Data
US 2017/0195112 A1    Jul. 6, 2017

(30) Foreign Application Priority Data

May 23, 2014  (JP) .................................. 2014-107513

(51) Int. Cl.
*H04L 27/22*    (2006.01)
*H04L 7/00*    (2006.01)

(52) U.S. Cl.
CPC .......... *H04L 7/0079* (2013.01); *H04L 7/0016* (2013.01)

(58) Field of Classification Search
CPC ...... H04L 7/0079; H04L 7/0016; H04L 27/26
See application file for complete search history.

(56) References Cited

U.S. PATENT DOCUMENTS 6,130,859 A * 10/2000 Sonnenschein ........ H04B 13/02
                                                    340/850
6,249,539 B1 *  6/2001 Harms ................... H04B 7/216
                                                    375/130

(Continued)

FOREIGN PATENT DOCUMENTS

CN         103117978 A     5/2013
JP         2012-528521 A   11/2012

(Continued)

OTHER PUBLICATIONS

International Search Report and Written Opinion dated Jul. 7, 2015 corresponding to International Patent Application No. PCT/JP2015/064314 and partial English translation thereof.

(Continued)

*Primary Examiner* — Jaison Joseph
(74) *Attorney, Agent, or Firm* — Squire Patton Boggs (US) LLP

(57) ABSTRACT

In order to efficiently compensate for effects of the Doppler shift, a receiving device includes a Doppler estimator that estimates a Doppler-shift frequency fdc of a received signal. A multiplier and an LPF detect the received signal based on a carrier frequency fc of the received signal and the Doppler-shift frequency fdc estimated by the Doppler estimator 11. A timing corrector corrects a timing T for extracting symbols of the received signal after detection by the LPF so as to track the Doppler shift. A symbol extractor extracts received symbols from the received signal after detection by the LPF (Continued)

env(t): Complex envelope after Quadrature detection
$x_k$: Input symbol to Adaptive equalizer
T: Symbol cycle
fc: Carrier frequency
fdc: Doppler-shift frequency at a timing corrected by the timing corrector. An adaptive equalizer estimates and determines symbols from the received symbols extracted by the symbol extractor.

8 Claims, 4 Drawing Sheets

(56) References Cited

U.S. PATENT DOCUMENTS

2009/0274222 A1* 11/2009 Morelli ............... H04L 27/2655
                                                               375/260
2010/0073227 A1*  3/2010 Waters ................. G01S 19/235
                                                               342/357.48

FOREIGN PATENT DOCUMENTS

JP           2013-038505 A      2/2013
WO      WO 2007/122675 A1    11/2007

OTHER PUBLICATIONS

Mark Johnson et al.: "Improved Doppler Tracking and Correction for Underwater Acoustic Communications," IEEE, in Proc. ICAASP'97, Munich, Germany, 1997, p. 575-578.
Bayan S. Sharif et al.: "A Computationally Efficient Doppler Compensation System for Underwater Acoustic Communications," IEEE Journal of Oceanic Engineering, vol. 25, No. 1, Jan. 2000, pp. 52-61.

* cited by examiner env(t) : Complex envelope after Quadrature detection
$x_k$ : Input symbol to Adaptive equalizer
T : Symbol cycle
fc : Carrier frequency
fdc : Doppler-shift frequency Input SNR 15.0
Output SNR -2.9
Symbol Error 921
FFtaps f 8
FFtaps b 4
FBtaps 4
Vs 20.0

In SNR 15.0
Out SNR 16.5
Symbol Error 0
FFtaps f 8
FFtaps b 4
FBtaps 4
Vs 20.0 env(t) : Complex envelope after Quadrature detection
$x_k$ : Input symbol to Adaptive equalizer
T : Symbol cycle
fc : Carrier frequency
fdc : Doppler-shift frequency env(t): Complex envelope after Quadrature detection
$x_k$: Input symbol to Adaptive equalizer
T: Symbol cycle
fc: Carrier frequency
fdc: Doppler-shift frequency

RECEIVING DEVICE AND RECEIVING METHOD

TECHNICAL FIELD

The present invention relates to a receiving device and a receiving method for compensating for effects of the Doppler shift caused by, for example, a transmitter or a receiver moving during digital communication.

BACKGROUND ART

Digital communication, especially sound-wave digital communication in the water (underwater acoustic digital communication), has problems to be solved such as interference from multipath waves, noises, restriction on bandwidth that can be used, and restriction on transmission level of waves that can be sent by a wave transmitter. One of the biggest problems among them is effects of the Doppler shift caused by a communication device (transmitter or receiver) on the move at a transmitting side or a receiving side.

A technique of phase compensation by a DPLL (Digital Phase Locked Loop) circuit, which is incorporated in an adaptive equalizer, has been applied to the effects of the Doppler shift. However, filtering by the adaptive equalizer can not sufficiently react to the Doppler shift caused by a fast moving speed. This is because timing of extracting symbols is shifted from a desired position due to the effects of the Doppler shift.

Therefore, further compensation is carried out for the timing error by re-sampling data with an interpolation filter, (as discussed, for example, in Patent Documents 1 (Japanese Translation of PCT International Application Publication No. 2012-528521) and 2 (Japanese Patent Application Publication No. 2013-038505), for example). However, the interpolation is merely made between data points, that is, approximation to obtain inaccurate data to be exact, and the processing uses such as a fixed FIR filter to fail to react for a case where the Doppler shift varies by time. A technique such as switching a filter has been conceived to react to the variation by time, but the result is that tracking capability is insufficient and computational load is increased due to switching of the filter.

As a result, no application example in underwater acoustic digital communication has been successful in reacting to a moving speed faster than several meters per second, as disclosed in Non-Patent Documents 1 (M. Johnson, L. Freitag and M. Stojanovic, "Improved Doppler Tracking and Correction for Underwater Acoustic Communications," in Proc. ICAASP'97, Munich, Germany, pp. 575-578) and 2 (B. S. Sharif, J. Neasham, O. R. Hinton and A. E. Adams, "A computationally efficient Doppler compensation system for underwater acoustic communication," IEEE J. Oceanic Eng., Vol. OE-25, pp. 52-61, 2000).

SUMMARY OF THE INVENTION

Problems to be Solved

As described above, effects of the Doppler shift are critical in underwater acoustic digital communication, but it is now very difficult to compensate for the Doppler shift while a communication device is moving at a speed of several knots (1 knot is about 0.5 m/s) or more, even for the steady Doppler shift alone.

Solution to Resolve Problems

The present invention has been made in view of such problems to provide a receiving device and a receiving method that can efficiently compensate for effects of the Doppler shift.

Solution to Resolve Problems

A first aspect of the present invention is to provide a receiving device for receiving a signal transmitted from a transmitter in a mobile communication system having large effects of the Doppler shift, including: a Doppler estimator that estimates a Doppler-shift frequency fdc of the received signal; a detector that detects the received signal based on a carrier frequency fc of the received signal and the Doppler-shift frequency fdc estimated by the Doppler estimator; a timing corrector that corrects a timing T for extracting symbols of the received signal after detection by the detector, so as to track the Doppler shift; a symbol extractor that extracts received symbols from the received signal after detection by the detector at a timing corrected by the timing corrector; and a symbol processor that determines the received symbols extracted by the symbol extractor, and to provide a receiving method corresponding to the receiving device.

According to the first aspect, even in a case where a transmitter and/or a receiver move(s) fast and dynamically in a mobile communication system having large effects of the Doppler shift, the timing T for extracting symbols of the received signal after detection is corrected so as to track the Doppler shift, to efficiently compensate for the effects of the Doppler shift, as compared to compensation for the same using a conventional interpolation technique. Note that an adaptive equalizer is used as the symbol processor in embodiments described herein, but any alternative may be used, as long as it fulfills the same function.

A second aspect of the present invention is that the timing corrector corrects the timing T based on the Doppler-shift frequency fdc estimated by the Doppler estimator.

According to the second aspect, the timing T is corrected based on the estimated Doppler-shift frequency fdc, to efficiently compensate for the effects of the steady Doppler shift in particular.

A third aspect of the present invention is that the symbol processor includes a phase error detector that detects a phase error $\theta_k$ of the received symbol extracted by the symbol extractor. In a case where an adaptive equalizer is used as the symbol processor, a phase difference is calculated in the adaptive equalizer and then this may be used to output a phase error. Here, the timing corrector corrects the timing T based on the phase error $\theta_k$ of the received symbol which is detected by the phase error detector in the symbol processor.

According to the third aspect, the timing T is corrected based on the phase error $\theta_k$ of the received symbol which is detected by the phase error detector, to efficiently compensate for the effects of the dynamic Doppler shift in particular.

A fourth aspect of the present invention is that the symbol processor includes a phase error detector that detects a phase error $\theta_k$ of the received symbol extracted by the symbol extractor. In a case where an adaptive equalizer is used as the symbol processor, a phase difference is calculated in the adaptive equalizer and then this may be used to output a phase error. Here, the timing corrector corrects the timing T based on the Doppler-shift frequency fdc estimated by the Doppler estimator and the phase error $\theta_k$ of the received symbol which is detected by the phase error detector in the symbol processor.

According to the fourth aspect, the timing T is corrected based on the estimated Doppler-shift frequency fdc and the phase error $\theta_k$ of the received symbol which is detected by phase error detector, to efficiently compensate for the effects of the steady Doppler shift and the dynamic Doppler shift at the same time.

Note that any combination of above-described components and aspects, and any one of a method, a device, a system, and a computer program that adapt the description of the present invention into respective forms is valid as an aspect of the present invention.

Advantageous Effects of the Invention

The present invention provides a receiving device and a receiving method that can efficiently compensate for effects of the Doppler shift.

EMBODIMENTS OF THE INVENTION

Acoustic digital communication in the water is largely affected by the Doppler shift because of a transmitter and/or a receiver being on the move, and it is currently very hard to react to a moving speed faster than several knots (1 knot is about 0.5 m/s) even on the condition that the move is at a steady speed (see Non-Patent Documents 1 and 2, for example). In underwater acoustic communication, if a moving body in the water moves at 4 knots, for example, with respect to the propagation speed of the sound waves of about 1500 m/s, the Doppler ratio is $1.33 \times 10^{-3}$. By contrast, in radio wave communication in the air, if a moving body moves at a speed of 100 km/hour with respect to the propagation speed of the radio wave of $3 \times 10^8$ m/s, the Doppler ratio is $0.93 \times 10^{-7}$. Then, the magnitude of effects (of the Doppler shift) due to a moving body is, literally, several orders of magnitude larger in underwater acoustic communication than in radio wave communication in the air.

Such effects of the Doppler shift has conventionally been compensated by a method of compensating a phase using a DPLL circuit, which is incorporated in an adaptive equalizer, and further compensating a timing error by re-sampling data using an interpolation filter. However, this method has not been successful in reducing the effects of the Doppler shift due to a steady but fast moving speed or a dynamically varying speed.

In contrast, the present invention directly corrects timing for extracting symbols, based on, for the steady Doppler shift, an estimated value of a steady component of the Doppler shift, and, for the varying Doppler shift, a phase error after determining a symbol in an adaptive equalizer. This allows for efficiently and remarkably improving demodulation performance, as compared with the conventional method.

First Embodiment

In a first embodiment, a description will be given of a receiving device and a receiving method that compensate in underwater acoustic digital communication for effects of the steady Doppler shift caused by a transmitter and/or a receiver moving. For example, as shown in FIG. 1, a case is assumed where observation data is transmitted, by means of acoustic signals propagating in the water, from a transmitter 200 in an autonomous underwater vehicle (AUV) 2, which moves at a substantially steady speed, to a receiver 100 on a receiver side (mother ship 1).

FIG. 2 is a diagram illustrating an exemplary configuration of a receiving device according to the first embodiment. A receiving device 101 is mounted, for example, in the receiver 100 on the mother ship to receive the acoustic signals transmitted in the water from the transmitter 200 for demodulation. The receiving device 101 includes a Doppler estimator 11, a multiplier 12, a low pass filter (LPF) 13, a symbol extractor 14, an adaptive equalizer 15, and a timing corrector 161.

The Doppler estimator 11 inputs a digital signal (received digital signal) obtained through A/D conversion of a received signal. The Doppler estimator 11 estimates a steady Doppler frequency fdc from the received digital signal. A method presented in Non-Patent Document 2 may be used for Doppler estimation, for example, and any one of known methods may be used. Note that, in a case where the Doppler shift varies by time, fdc will be an averaged value, that is, a value having only the steady component of the Doppler shift estimated.

Next, as a quadrature detection process, a multiplier 12 uses [fc+fdc], which is obtained through correction of a carrier frequency fc with the steady Doppler frequency fdc estimated by the Doppler estimator 11, to multiply the received digital signal by $\exp(-j2\pi(fc+fdc)t)$ for passing the product through the LPF 13 to obtain a complex envelope signal as a received signal after detection.

The timing corrector 161 corrects a timing T for extracting symbols from the received signal after detection so as to track the Doppler shift. Details will be described later for a correction process. Here, the symbol extractor 14 extracts symbols from the complex envelope signal at the corrected timings as input to the adaptive equalizer 15. The corrected timing may be used for each symbol or for the predetermined number of symbols.

The adaptive equalizer 15 is configured such as with a feed-forward filter, a feedback filter, and a symbol determiner to determine a transmitted symbol from the symbol extracted by the symbol extractor 14. Note that the modulation scheme for digital communication primarily includes a Binary Phase-Shift Keying (BPSK), a Quadrature Phase-Shift Keying (QPSK), a Quadrature Amplitude Modulation (QAM), and processing for the Doppler shift according to the present embodiment remains the same for any of these schemes, or any other modulation scheme.

Here, a description will be given of a specific example of symbol extraction timing to be corrected by the timing corrector 161. On the condition that the complex envelope signal after the quadrature detection is represented by env(t), symbols are usually extracted according to Equation (1) so as to be inputted to the adaptive equalizer 15, without correction on the constant symbol cycle T by the timing corrector 161. In contrast, the first embodiment uses fdc estimated by the Doppler estimator 11, as shown in Equation (2), to correct the symbol cycle T in the timing corrector 161 for sampling. That is, Equation (2) indicates that T is corrected to T(fc/(fc+fdc)).

$$x_k = [x_{k-L1}, \ldots, x_k, \ldots, x_{k+L2}] \qquad (1)$$
$$= \sum_{k=-L1}^{L2} env(t)\delta(t - kT).$$

$$x_k = [x_{k-L1}, \ldots, x_k, \ldots, x_{k+L2}] \quad (2)$$

$$= \sum_{k=L1}^{L2} env(t)\delta\left(t - kT \cdot \frac{fc}{fc+fdc}\right).$$

Here, T represents the symbol cycle, $\chi_k$ represents a symbol to be inputted to the adaptive equalizer 15, [L1+L2] represents the number of taps of the feed-forward filters in the adaptive equalizer 15, where L1 is the number of taps on a past side and L2 is that on a future side.

That is, Equation (1) indicates that [L1+L2] symbols are extracted from the complex envelope signal env(t) at an interval of the symbol cycle T. Also, Equation (2) indicates that symbols are extracted at a timing that is obtained by correcting the timing for the symbol extraction on the basis of the steady Doppler frequency fdc estimated by the Doppler estimator 11. This processing allows an error of the symbol timing to be corrected so as to sufficiently compensate for effects of the Doppler shift due to fast movement. In a case where the steady Doppler shift is dominant, the varying Doppler components can be compensated such as by the adaptive equalizer, and therefore this processing alone can sufficiently fulfill the compensation.

FIGS. 3A and 3B show an example of simulation results for the steady Doppler shift. They show demodulated BPSK signals in a case where the transmitter is moving at a constant speed of 20 m/s. FIG. 3A shows signals demodulated with conventional Equation (1), and FIG. 3B shows those with Equation (2) of the first embodiment applied. FIG. 3B indicates that even the effects of the Doppler shift due to movement at a speed of 20 m/s, which is very fast for a vehicle moving on the sea or in the water, were compensated so that the received symbol points converge at around correct values of ±1, to achieve error-free demodulation.

Therefore, according to the first embodiment as described above, even in a case where the transmitter and/or the receiver move fast and dynamically, the varying Doppler components can sufficiently be compensated by the adaptive equalizer 15, on the condition that the steady Doppler shift is dominant, and correcting the timing T based on the estimated Doppler-shift frequency fdc allows for compensating for the effects of the Doppler shift efficiently and accurately through simple calculations, as compared with the compensation using a conventional interpolation technique for the effects of the Doppler shift.

Second Embodiment

In a second embodiment, a description will be given of a receiving device and a receiving method that compensate for effects of the Doppler shift in a case where the dynamic Doppler shift is dominant, for example, such that the mother ship 1 on the receiving side is severely shaken, as shown in FIG. 4.

FIG. 5 is a diagram illustrating an exemplary configuration of a receiving device according to the second embodiment. A receiving device 102 includes the Doppler estimator 11, the multiplier 12, the LPF 13, the symbol extractor 14, the adaptive equalizer 15, and a timing corrector 162. Note that a difference from the first embodiment is that the timing corrector 162 has a function of correcting timing for extracting symbols based on a phase error of a symbol obtained by the adaptive equalizer 15. Others are the same as those in the first embodiment, and then details thereof will not be described.

Here, an adaptive equalizer 151 as shown in FIG. 6 will be used as an example of the adaptive equalizer 15. An input symbol $\chi_k$ is estimated by a feed-forward filter and a feedback filter, and then determined by a symbol determiner 63. Tap coefficients of a feed-forward filter 61 and a feedback filter 62 are updated by an adaptive algorithm processor 64. The adaptive algorithm processor 64 is a functional block for processing a known adaptive algorithm such as a Least Mean Square (LMS) algorithm.

In addition, a DPLL 65 is included in the adaptive equalizer 151 to compensate for a phase. A phase error $\theta_k$ is obtained from a phase angle of $[\tilde{d}_k - d_k]$ (argument of a complex number), that is, from the difference between the estimated symbol and the correct symbol (as judged). Effects of the Doppler shift will be compensated by such phase compensation in the adaptive equalizer 151 if the moving speed is low, but will not be compensated if the moving speed is high. This is because the timing of extracting symbols is shifted due to the effects of the Doppler shift, as described before.

Then, in the second embodiment, the phase error $\theta_k$ is fed back to the timing corrector 162. Specifically, in place of conventionally extracting symbols as indicated in Equation (1) above, the symbol extractor 14 extracts symbols as indicated in Equation (3) below at a timing of $[T - \theta_{k-1}/2\pi(fc+fdc)]$, which is obtained through correction of the timing T by the timing corrector 162.

$$x_k = [x_{k-L1}, \ldots, x_k, \ldots, x_{k+L2}] \quad (3)$$

$$= \sum_{k=L1}^{L2} env(t)\delta\left(t - k\left(T - \frac{\theta_{k-1}}{2\pi(fc+fdc)}\right)\right).$$

This process dynamically corrects the timing for extracting symbols based on the phase error $\theta_K$. A timing for extracting symbols to be inputted to the adaptive equalizer 151 is obtained from the complex envelope signal after the LPF 13, and then adjusted based on the phase error $\theta_k$. Load of calculations is very lighter compared such as with a conventional interpolation technique, to allow for fully tracking the varying Doppler shift.

FIGS. 7A and 7B show an example of simulation results for the dynamic Doppler shift. They show demodulated BPSK signals in a case where the receiver has simple harmonic motion with amplitude of 6 m in a cycle of 2 seconds. FIG. 7A shows signals demodulated with conventional Equation (1), and FIG. 7B shows those with Equation (3) of the second embodiment applied. FIG. 7B indicates that applying the technique of the second embodiment allows for demodulating signals, for example, even in a case where the mother ship (water vessel) on the receiving side is severely shaken with such amplitude and cycle.

Note that an element corresponding to the adaptive equalizer 151 can be any one but the adaptive equalizer 151 as shown herein, as far as it serves as a symbol determiner to "determine symbols and output a phase error." This holds true throughout Description.

Therefore, according to the second embodiment as described above, even in a case where the transmitter and/or the receiver moves fast and dynamically, correcting the timing T based on the phase error $\theta_k$ allows for compensating for the effects of the Doppler shift efficiently and accurately through simple calculations even in a condition that the dynamic Doppler shift is dominant.

Third Embodiment

In a third embodiment, processing of the first and second embodiments as described above is combined to compensate for both the steady Doppler shift and the dynamic Doppler shift together as shown in FIG. 8.

FIG. 9 is a diagram illustrating an exemplary configuration of a receiving device according to the third embodiment. A receiving device 103 includes the Doppler estimator 11, the multiplier 12, the LPF 13, the symbol extractor 14, the adaptive equalizer 15, and a timing corrector 163. Note that a difference from the first and second embodiments lies in a timing corrected by the timing corrector 163 for extracting symbols. Others are the same as those in the second embodiment, and then details thereof will not be described.

As shown in FIG. 9, the timing corrector 163 corrects the timing for extracting symbols, based on the Doppler frequency fdc estimated by the Doppler estimator 11 and the phase error $\theta_k$ detected by the adaptive equalizer 15.

That is, the first and second embodiments as described above can be implemented together as in Equation (4) below. That is, the timing corrector 163 corrects the timing T so as to be $[T(fc/(fc+fdc))-\theta_{k-1}/2\pi(fc+fdc)]$, based on the estimated Doppler-shift frequency fdc and the phase error $\theta_k$ of the received symbol which is detected by the adaptive equalizer.

$$x_k = [x_{k-L1}, \ldots, x_k, \ldots, x_{k+L2}] \quad (4)$$

$$= \sum_{k=L1}^{L2} env(t)\delta\left(t - k\left(T\frac{fc}{fc+fdc} - \frac{\theta_{k-1}}{2\pi(fc+fdc)}\right)\right).$$

FIGS. 10A and 10B show an example of simulation results for the steady Doppler shift and the varying Doppler shift. They show demodulated BPSK signals in a case where the transmitter moves at a constant speed of 20 m/s and the receiver is shaken with amplitude of 2 m in a cycle of 10 seconds. FIG. 10A shows signals demodulated with conventional Equation (1), and FIG. 10B shows those with Equation (4) of the third embodiment applied. FIG. 10B indicates that applying the technique of the third embodiment allows the effects of the steady Doppler shift and the dynamic Doppler shift to be compensated together, for example, even in a case where the transmitter (such as the AUV 2) moves at a constant speed and the receiver (such as the mother ship 1) is shaken.

In communication or the like between the mother ship 1 and the AUV 2, the respective techniques of the above-described embodiments may allow for communication or operation under a situation of moving at a fast speed and/or being shaken, which has never worked. Note that examples have been shown in the above-described embodiments in which receiving devices according to the present invention are applied to the underwater acoustic digital communication, but hardware performance of circuits may evolve in the future to allow such devices to be also applied to radio wave communication in the air.

In addition, the present embodiments have not described any approach to solving a multipath-wave problem, but if effects of multipath waves are small, the effects can be compensated by the adaptive equalizer. Further, if the effects of multipath waves are large, the present invention may be combined with a method for solving a multipath-wave problem, such as beam forming and time reversal.

Hereinabove, the present invention has been described based on the embodiments. The present invention is not limited to the contents of the embodiments described above, and may be implemented with various modifications within the scope of the present invention. A person skilled in the art will appreciate that the above-described embodiments are merely examples and various modifications are possible by combining individual components and processing steps, where such modifications are also within the scope of the present invention.

In summary, the effects of the Doppler shift can effectively be compensated in underwater acoustic digital communication.

Figure 1:
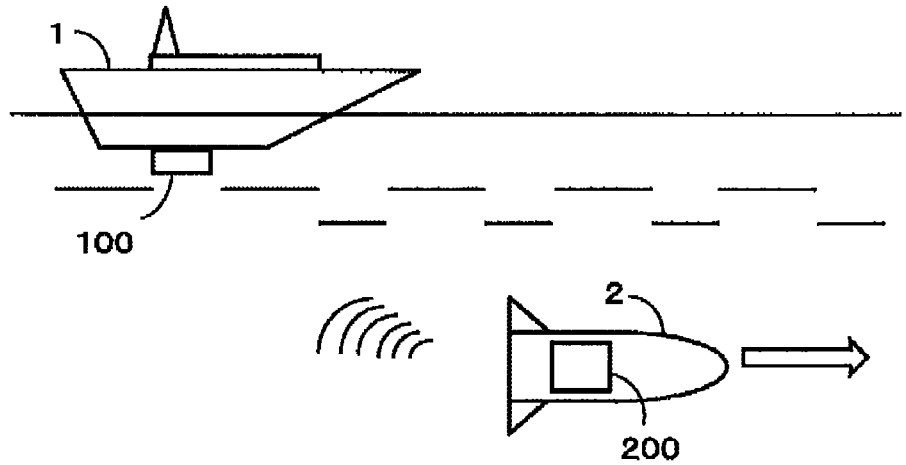
FIG. 1 is a conceptual diagram of an underwater acoustic communication system using a receiving device according to a first embodiment.
Figure 2:
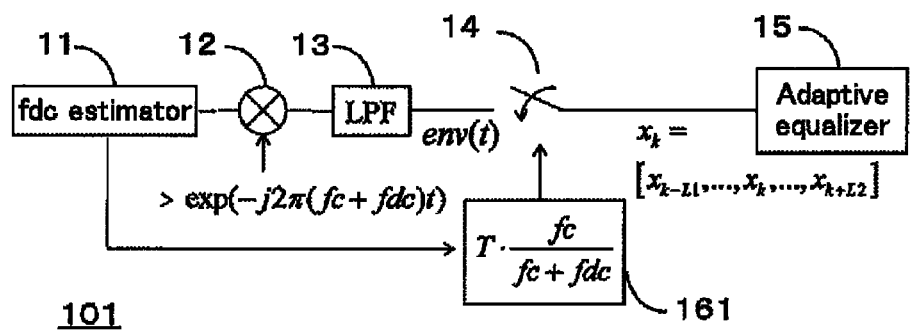
FIG. 2 is a diagram illustrating an exemplary configuration of the receiving device according to the first embodiment.
Figure 3A:
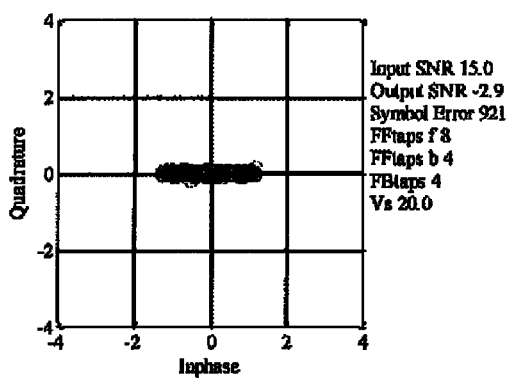
FIGS. 3A and 3B are charts showing results of simulations with the receiving device in FIG. 2.
Figure 3B:
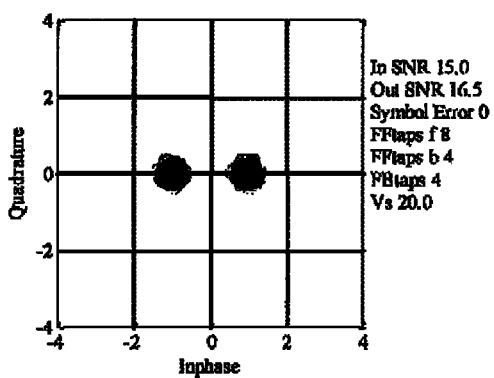
Figure 4:
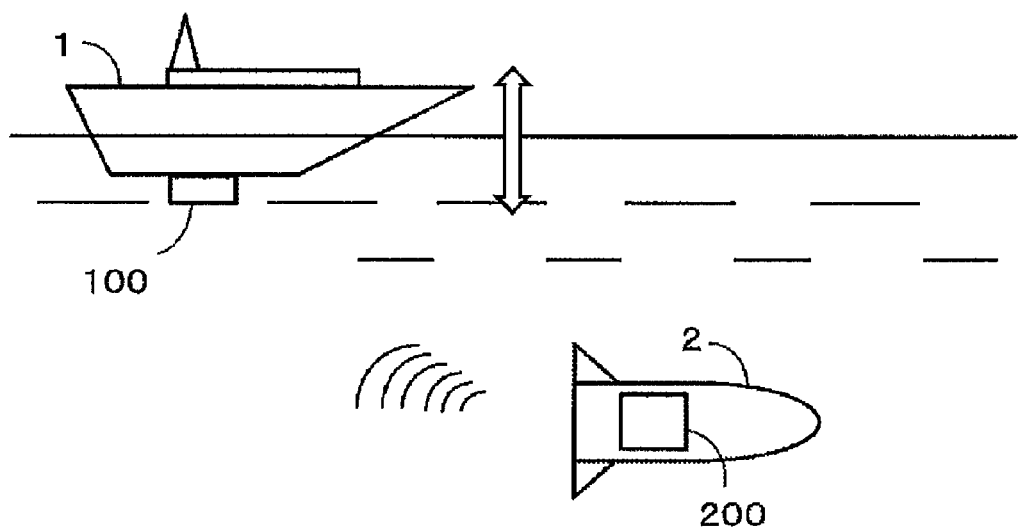
FIG. 4 is a conceptual diagram of an underwater acoustic communication system using a receiving device according to a second embodiment.
Figure 5:
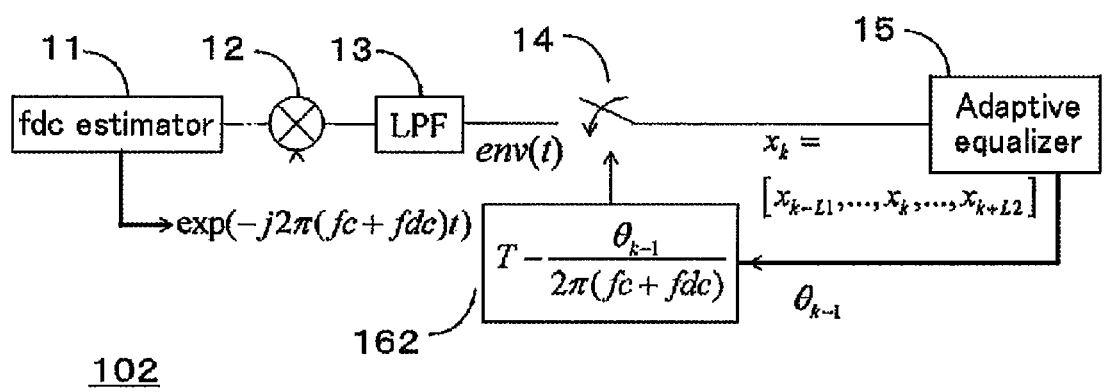
FIG. 5 is a diagram illustrating an exemplary configuration of the receiving device according to the second embodiment.
Figure 6:
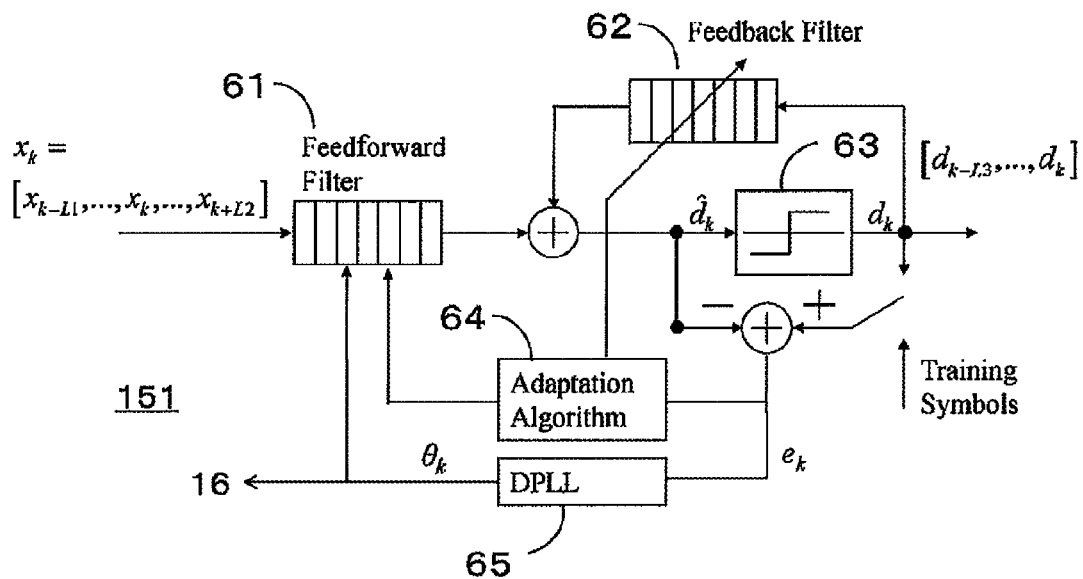
FIG. 6 is a diagram showing an exemplary configuration of an adaptive equalizer in FIG. 5.
Figure 7A:
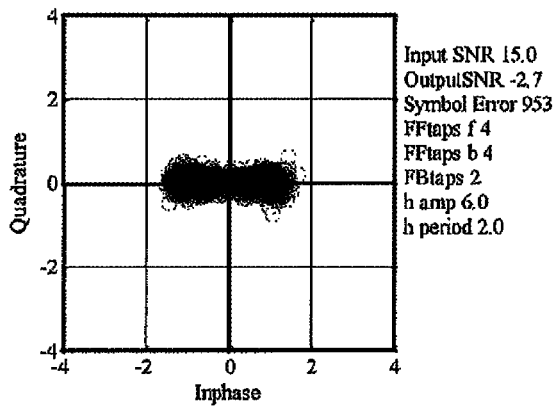
FIGS. 7A and 7B are charts showing results of simulations with the receiving device in FIG. 5.
Figure 7B:
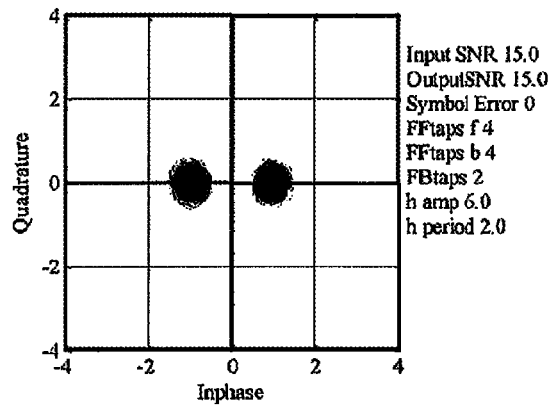
Figure 8:
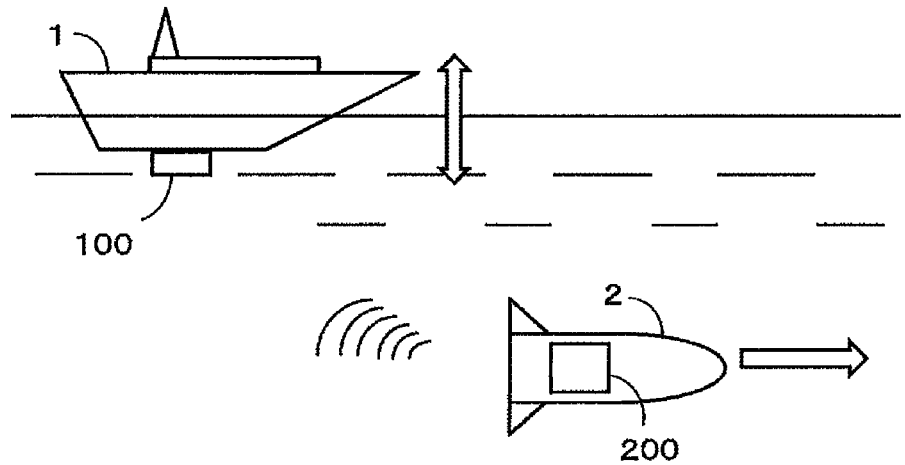
FIG. 8 is a conceptual diagram of an underwater acoustic communication system using a receiving device according to a third embodiment.
Figure 9:
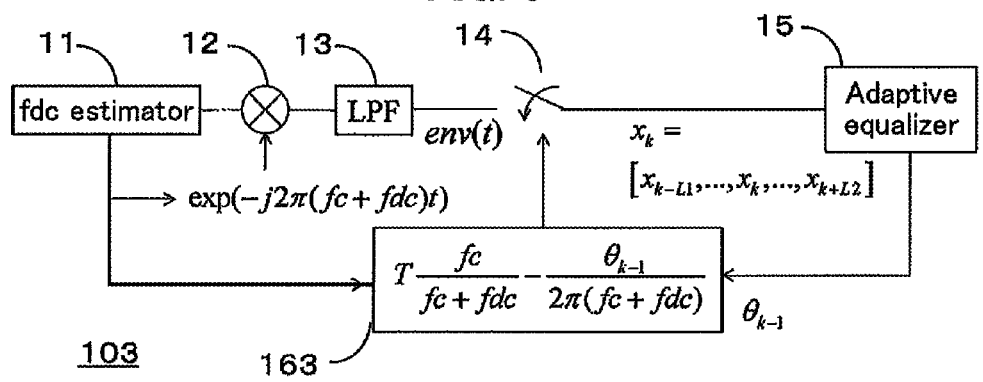
FIG. 9 is a diagram illustrating an exemplary configuration of the receiving device according to the third embodiment.
Figure 10A:
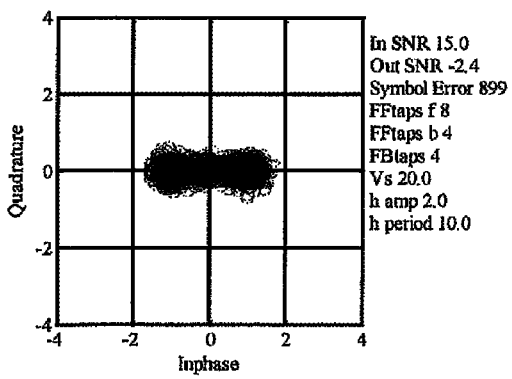
FIGS. 10A and 10B are charts showing results of simulations with the receiving device in FIG. 6.
Figure 10B:
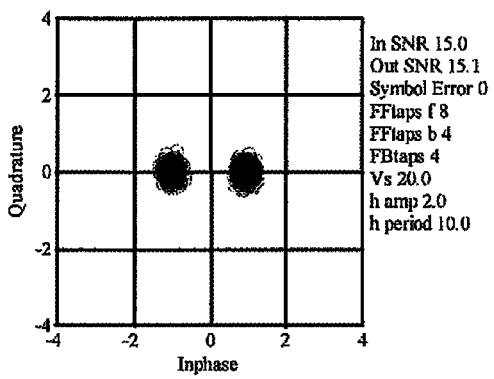

The invention claimed is:

1. A receiving device for receiving a signal transmitted from a transmitter in a mobile communication system having large effects of the Doppler shift, comprising:
    a Doppler estimator that estimates a Doppler-shift frequency fdc of the received signal;
    a detector that detects the received signal based on a carrier frequency fc of the received signal and the Doppler-shift frequency fdc estimated by the Doppler estimator;
    a timing corrector that corrects a timing T for extracting symbols of the received signal after detection by the detector, so as to track the Doppler shift;
    a symbol extractor that extracts received symbols from the received signal after detection by the detector at a timing corrected by the timing corrector; and
    a symbol processor that determines the received symbols extracted by the symbol extractor.

2. The receiving device according to claim 1, wherein the timing corrector corrects the timing T based on the Doppler-shift frequency fdc estimated by the Doppler estimator.

3. The receiving device according to claim 1, wherein
the symbol processor includes a phase error detector that detects a phase error $\theta_k$ of the received symbol extracted by the symbol extractor, and
the timing corrector corrects the timing T based on the phase error $\theta_k$ of the received symbol which is detected by the phase error detector in the symbol processor.

4. The receiving device according to claim 1, wherein
the symbol processor includes a phase error detector that detects a phase error $\theta_k$ of the received symbol extracted by the symbol extractor, and
the timing corrector corrects the timing T based on the Doppler-shift frequency fdc estimated by the Doppler estimator and the phase error $\theta_k$ of the received symbol which is detected by the phase error detector in the symbol processor.

5. A receiving method used for a receiving device that receives a signal transmitted from a transmitter in a mobile communication system having large effects of the Doppler shift,
the method comprising:
estimating, in a Doppler estimation step, a Doppler-shift frequency fdc of the received signal;
detecting, in a detection step, the received signal based on a carrier frequency fc of the received signal and the Doppler-shift frequency fdc which has been estimated in the Doppler estimation step;
correcting, in a timing correction step, a timing T for extracting symbols of the received signal after detection in the detection step, so as to track the Doppler shift;
extracting, in a symbol extraction step, received symbols from the received signal after detection in the detection step at a timing which has been corrected in the timing correction step; and
determining, in a symbol processing step, the received symbols which have been extracted in the symbol extraction step.

6. The receiving method according to claim 5, wherein
the timing T is corrected in the timing correction step based on the Doppler-shift frequency fdc which has been estimated in the Doppler estimation step.

7. The receiving method according to claim 5, further comprising:
detecting, in the symbol processing step, a phase error $\theta_k$ of the received symbol which has been extracted in the symbol extraction step,
wherein
the timing T is corrected in the timing correction step based on the phase error $\theta_k$ which has been detected in the symbol processing step.

8. The receiving method according to claim 5, further comprising:
detecting, in the symbol processing step, a phase error $\theta_k$ of the received symbol which has been extracted in the symbol extraction step,
wherein
the timing T is corrected in the timing correction step based on the Doppler-shift frequency fdc which has been estimated in the Doppler estimation step, and the phase error $\theta_k$ which has been detected in the symbol processing step.

* * * * *